(12) United States Patent
Morishita et al.

(10) Patent No.: US 10,882,491 B2
(45) Date of Patent: Jan. 5, 2021

(54) LOCK DEVICE

(71) Applicant: KABUSHIKI KAISHA TOKAI RIKA DENKI SEISAKUSHO, Aichi (JP)

(72) Inventors: Takuma Morishita, Aichi (JP); Koji Okuda, Aichi (JP); Takanori Matsuyama, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 29 days.

(21) Appl. No.: 16/298,120

(22) Filed: Mar. 11, 2019

(65) Prior Publication Data

US 2019/0283707 A1    Sep. 19, 2019

(30) Foreign Application Priority Data

Mar. 14, 2018  (JP) .................................. 2018-047283

(51) Int. Cl.
*B60R 25/0215*    (2013.01)

(52) U.S. Cl.
CPC .... *B60R 25/02153* (2013.01); *B60R 2325/30* (2013.01)

(58) Field of Classification Search
CPC .......... B60R 25/02153; B60R 25/0215; B60R 25/021; B60R 2325/30
See application file for complete search history.

(56) References Cited

U.S. PATENT DOCUMENTS

| | | | |
|---|---|---|---|
| 2008/0098777 A1* | 5/2008 | Tanioka | B60R 25/02153 70/184 |
| 2018/0086305 A1 | 3/2018 | Okuda et al. | |

FOREIGN PATENT DOCUMENTS

| | | |
|---|---|---|
| JP | 2002-283963 | 10/2002 |
| JP | 2014-104876 | 6/2014 |
| JP | 2014-113833 | 6/2014 |
| JP | 2018-052273 | 4/2018 |

OTHER PUBLICATIONS

Machine Translation of JP2014113833.*

* cited by examiner

*Primary Examiner* — Jeffrey M Shin
(74) *Attorney, Agent, or Firm* — Greenblum & Bernstein, P.L.C.

(57) ABSTRACT

A lock device includes a locking member, a movable member, and a transmission mechanism. The locking member is moved between a lock position at which it locks a locking subject and an unlock position at which it unlocks the locking subject. The transmission mechanism transmits a drive force to the movable member and moves the movable member. A movement state of the movable member is shifted between a relative movement state in which it is moved relative to the locking member and an integral movement state in which it is moved together with the locking member to move the locking member toward the lock or unlock position. The lock device further includes a detector of which an output value varies in accordance with movement of the movable member or the transmission mechanism, and a controller that performs a failure determination based on a change in the output value.

9 Claims, 3 Drawing Sheets

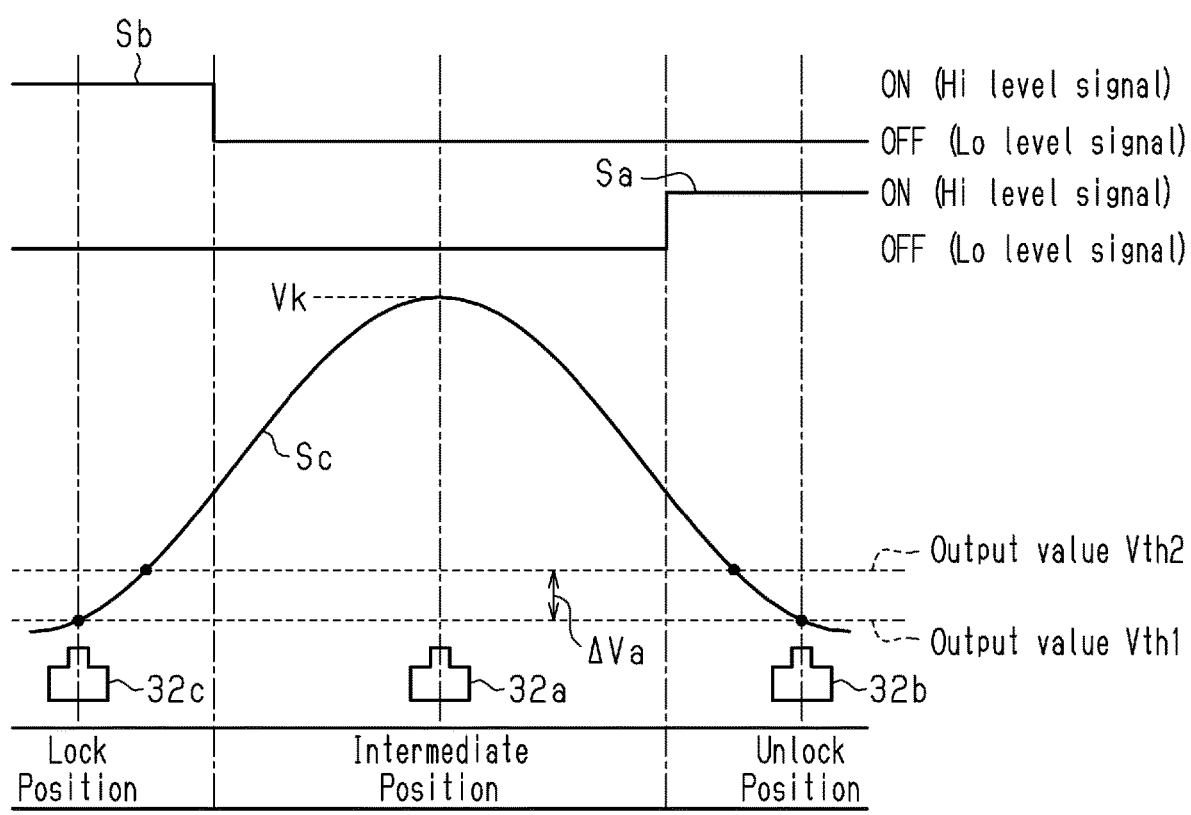

LOCK DEVICE

CROSS-REFERENCE TO RELATED APPLICATIONS

This application is based upon and claims the benefit of priority from prior Japanese Patent Application No. 2018-047283, filed on Mar. 14, 2018, the entire contents of which are incorporated herein by reference.

BACKGROUND

1. Field

The following description relates to a lock device.

2. Description of Related Art

A lock device locks and unlocks a locking subject. Japanese Laid-Open Patent Publication No. 2014-113833 describes an example of an electric steering lock device that locks and unlocks a steering shaft to restrict and permit rotation of the steering wheel.

FIGS. 3A and 3B illustrate an electric steering lock device 100 according to the related art. The electric steering lock device 100 includes a locking member 110 and a drive unit 120. The drive unit 120 moves the locking member 110 between a lock position (refer to FIG. 3A) and an unlock position (refer to FIG. 3B).

The locking member 110 is inserted through a hole 104 formed in a housing 102 of the electric steering lock device 100 in a manner allowing the locking member 110 to be moved linearly back and forth. The drive unit 120 includes a motor 122, a gear 124, a rotation shaft 126, and a lock stopper 128. The lock stopper 128 has an insertion portion 130, which is inserted into a slot 112 of the locking member 110 so that gaps S are formed in the slot 112 between the locking member 110 and the insertion portion 130. Further, a coil spring 132 is compressed between the insertion portion 130 and the locking member 110 to bias the locking member 110 toward the lock position. The rotation shaft 126 fixed to the gear 124 and connected to the lock stopper 128 is rotatable integrally with the gear 124 engaged with a rotation shaft 123 of the motor 122. A ball threaded mechanism 127 is formed at a position where the rotation shaft 126 and the lock stopper 128 are connected. The ball threaded mechanism 127 converts rotation movement of the rotation shaft 126 into linear forward and backward movement of the lock stopper 128. The motor 122, the gear 124, and the rotation shaft 126 form a transmission mechanism 129 that transmits the drive force of the motor 122 to the lock stopper 128 and moves the lock stopper 128.

With reference to FIG. 3A, the lock operation of the locking member 110 will now be described. In a state in which the locking member 110 is in the unlock position (FIG. 3B), the lock stopper 128 is moved toward a steering shaft 140 (rightward in FIG. 3A). Consequently, the elastic force of a coil spring 132 inserts a distal portion 114 of the locking member 110 into a recess 142 of the steering shaft 140. This locks the steering shaft 140 and restricts rotation of the steering wheel (not illustrated).

With reference to FIG. 3B, the unlock operation of the locking member 110 will now be described. In a state in which the locking member 110 is in the lock position (FIG. 3A), the lock stopper 128 is moved away from the steering shaft 140 (leftward in FIG. 3B). Consequently, the lock stopper 128 is moved relative to the locking member 110 to contact a wall surface of the slot 112. Then, the lock stopper 128 is moved with the locking member 110 away from the steering shaft 140 while maintaining the contact with the locking member 110. This removes the distal portion 114 of the locking member 110 from the recess 142 of the steering shaft 140 thereby unlocking the steering shaft 140 and permitting rotation of the steering wheel.

For example, when the locking member 110 is in the lock position (FIG. 3A), the steering wheel may be rotated thereby rotating the steering shaft 140 (for example, in direction A indicated by arrow in FIG. 3A). In this case, the distal portion 114 of the locking member 110 is pressed against the recess 142 of the steering shaft 140. This generates friction between the distal portion 114 and the recess 142 and hinders removal of the locking member 110 from the recess 142. In such a situation, it may be difficult to move the locking member 110 from the lock position to the unlock position.

Further, for example, when the locking member 110 is in the unlock position (FIG. 3B), the locking member 110 may be tilted by external force. This generates friction between the locking member 110 and a wall surface of the hole 104 of the housing 102. In such a situation, it may be difficult to move the locking member 110 from the unlock position to the lock position.

Further, for example, when the motor 122 fails (for example, when the motor experiences a cracked magnet or the like), the motor 122 will not generate rotation. In this case, the lock stopper 128 cannot be moved linearly back and forth. Thus, the locking member 110 cannot be moved from the lock position or the unlock position.

A typical technique determines that the electric steering lock device has failed when the lock stopper is moved from the lock position to the unlock position or from the unlock position to the lock position over a period exceeding a threshold value. With this technique, even if it is the locking member or the drive unit that has a failure, it will be determined that the electric steering lock device has failed when the moving period of the lock stopper exceeds the threshold value.

In this manner, it is difficult to determine where the failure is occurring in the drive force transmission system including the drive unit and the locking member. That is, it is difficult to distinguish a failure of the locking member from a failure of the drive unit such as the motor. This problem is not limited to the electric steering lock device and may occur in any lock device that locks and unlocks a locking subject.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lock device includes a locking member, a movable member, and a transmission mechanism. The locking member is moved between a lock position at which the locking member locks a locking subject and an unlock position at which the locking member unlocks the locking subject. The movable member is moved by a drive force. The transmission mechanism transmits the drive force to the movable member and moves the movable member. The movable member is moved in a relative movement state in which the movable member is moved relative to the lock and an integral movement state in which the movable member is moved together with the locking member to move the locking member toward the lock position or the unlock position. The lock device further includes a detector of which an output value varies in accordance with movement of the movable member or the transmission mechanism, and a controller that performs a failure determination based on a change in the output value.

Other features and aspects will be apparent from the following detailed description, the drawings, and the claims.

BRIEF DESCRIPTION OF THE DRAWINGS

FIG. 2 is a timing diagram illustrating processes of a position determination and a failure determination with the steering lock device.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An electric steering lock device 1, which is an example of a lock device, will now be described in accordance with an embodiment.

Figure 1A:
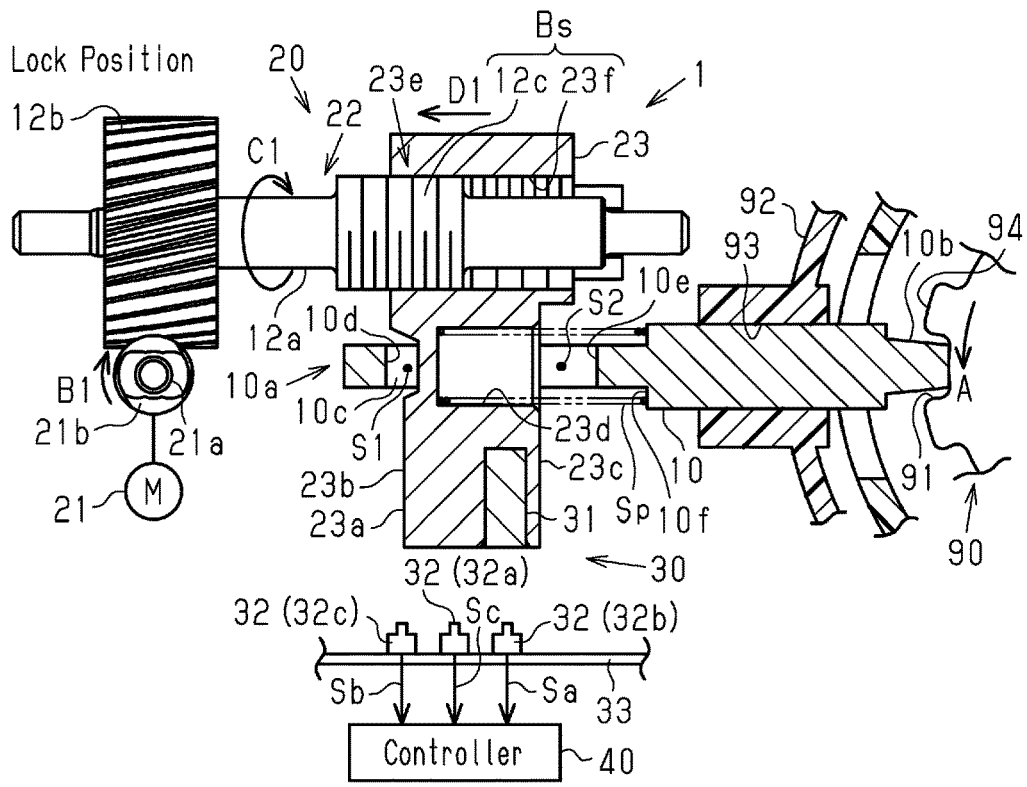
FIG. 1A is a schematic diagram of a steering lock device according to one embodiment when a locking member is in a lock position.

As illustrated in FIG. 1A, the electric steering lock device 1 is configured to move a locking member 10 between a lock position at which the locking member 10 locks the steering wheel, and an unlock position at which the locking member 10 unlocks the steering wheel.

The electric steering lock device 1 includes the locking member 10, a drive unit 20, a detection device 30, and a controller 40.

The locking member 10 is, for example, a plate including a distal portion 10b (right end in FIG. 1A) that is inserted through a hole 93 formed in a housing 92 of the electric steering lock device 1 in a manner allowing the locking member 10 to be moved linearly back and forth. When the locking member 10 reaches the lock position, the distal portion 10b engages a recess 91 of a steering shaft 90 and restricts movement of the steering wheel. When the locking member 10 is moved from the lock position to the unlock position, the distal portion 10b is separated from the recess 91. This permits movement of the steering wheel. The locking member 10 includes a basal portion 10a (left portion in FIG. 1A) at a side opposite to the distal portion 10b. The basal portion 10a includes, for example, a rectangular slot 10c. The slot 10c includes a first inner surface 10d arranged at the basal end side and a second inner surface 10e arranged at the distal end side. In the locking member 10, the distal portion 10b has a greater thickness than the basal portion 10a. A step 10f is formed at the boundary of the distal portion 10b and the basal portion 10a. In the present example, the steering shaft 90 corresponds to a locking subject.

The drive unit 20 includes a transmission mechanism 22 and a lock stopper 23. The transmission mechanism 22 includes a motor 21 that serves as a driving source. The lock stopper 23 is an example of a movable member. The drive unit 20 is configured to apply the drive force generated by the motor 21 to the locking member 10 through the transmission mechanism 22 and the lock stopper 23 and move the locking member 10. The motor 21 has a rotation shaft 21a on which a worm gear 21b is arranged. The lock stopper 23 is configured to be moved between a first position, which corresponds to the lock position, and a second position, which corresponds to the unlock position. The lock stopper 23 is for example a rectangular post that includes an insertion portion 23a defined at one side (lower side in FIG. 1A) and an inserted portion 23e defined at the other side (upper side in FIG. 1A). The insertion portion 23a is inserted into the slot 10c of the locking member 10. The insertion portion 23a includes a first outer surface 23b that opposes the first inner surface 10d of the slot 10c and a second outer surface 23c that opposes the second inner surface 10e of the slot 10c. In the lock position, a first gap S1 extends between the first inner surface 10d of the slot 10c and the first outer surface 23b of the insertion portion 23a, and a second gap S2 extends between the second inner surface 10e of the slot 10c and the second outer surface 23c of the insertion portion 23a. In the unlock position, the second gap S2 is formed, but the first gap S1 is not formed. The insertion portion 23a includes a receptacle 23d that receives one end of a coil spring Sp at a location opposing the second inner surface 10e. The other end of the coil spring Sp abuts the step 10f of the locking member 10. The inserted portion 23e of the lock stopper 23 includes a threaded hole 23f. A threaded shaft portion 12c of a rotation shaft 12a, which will be described later, is inserted into the threaded hole 23f.

The transmission mechanism 22 transmits the drive force of the motor 21 to the lock stopper 23 and moves the lock stopper 23. The transmission mechanism 22 includes the rotation shaft 12a and a gear 12b (left side in FIG. 1A) that is arranged integrally with the rotation shaft 12a. The gear 12b is engaged with the worm gear 21b of the motor 21. The threaded shaft portion 12c is arranged on the rotation shaft 12a at the side opposite to the gear 12b. The threaded shaft portion 12c is inserted into the threaded hole 23f of the inserted portion 23e of the lock stopper 23. The threaded shaft portion 12c of the rotation shaft 12a and the threaded hole 23f of the lock stopper 23 construct a ball threaded mechanism Bs. When the motor 21 is driven and the rotation shaft 12a is rotated, the lock stopper 23 is linearly moved forward and backward by the ball threaded mechanism Bs. In other words, the ball threaded mechanism Bs converts rotation movement of the rotation shaft 12a into linear forward and backward movement of the lock stopper 23. The drive force of the motor 21 is transmitted from the transmission mechanism 22 through the lock stopper 23 to the locking member 10. In the present description, the path through which the drive force is transmitted will be referred to as a drive force transmission system. In the present example, the drive force transmission system includes the drive unit 20 and the locking member 10.

The detection device 30 includes a magnet 31, a detection unit 32, and a base plate 33. The magnet 31 is integrally arranged with a lower end of the lock stopper 23 (lower side in FIG. 1A). The detection unit 32 is mounted on the base plate 33 that is arranged in the housing 92 of the electric steering lock device 1. The detection unit 32 includes a first detector 32a, a second detector 32b, and a third detector 32c. The first detector 32a is located between the second detector 32b and the third detector 32c. The first detector 32a, the second detector 32b, and the third detector 32c are magnetic sensors that detect the magnetic field of the magnet 31. Each magnetic sensor may be a magneto resistive element (MRE) or a Hall IC.

The first detector 32a is located at a position that opposes the magnet 31 when the locking member 10 is located at an intermediate position between the lock position and the unlock position. The first detector 32a is an analog sensor of which an output value Sc is an analog value. The output value Sc varies in accordance with the positional relationship of the first detector 32a and the magnet 31. In the present example, the output value Sc varies in a parabolic manner in accordance with the positional relationship of the first detector 32a and the magnet 31 (refer to FIG. 2).

The second detector 32b is located at a position that opposes the magnet 31 when the locking member 10 is in the lock position (refer to FIG. 1A). The third detector 32c is located at a position that opposes the magnet 31 when the locking member 10 is in the unlock position (refer to FIG. 1B).

The second detector 32b is a digital sensor that outputs an output value Sa as a digital value. The second detector 32b outputs a binary signal (high level signal or low level signal) having the output value Sa corresponding to the positional relationship of the second detector 32b and the magnet 31. In the same manner, the third detector 32c is a digital sensor that outputs an output value Sb as digital value. The third detector 32c outputs a binary signal (high level signal or low level signal) having the output value Sb corresponding to the positional relationship of the third detector 32c and the magnet 31.

The controller 40 is configured to control the drive unit 20. The controller 40 controls actuation of the motor 21 and receives the output values Sa, Sb, and Sc from the detection unit 32. The controller 40 determines the positions of the lock stopper 23 and the locking member 10 based on changes in the output values Sa and Sb of the second and third detectors 32b and 32c. Further, the controller 40 determines failure of the electric steering lock device 1 based on a change in the output value Sc when the lock stopper 23 is moved.

The movement of the locking member 10 between the lock position and the unlock position in the electric steering lock device 1 will now be described.

Movement from lock position to unlock position

Referring to FIG. 1A, when the rotation shaft 21a of the motor 21 is rotated in one direction (direction B1 indicated by arrow in FIG. 1A), the rotation shaft 12a is rotated in one direction (direction C1 indicated by arrow in FIG. 1A) and the lock stopper 23 is moved in an unlock direction (direction D1 indicated by arrow in FIG. 1A), that is, away from the steering shaft 90. This moves the lock stopper 23 relative to the locking member 10 and closes the first gap S1.

Figure 1B:
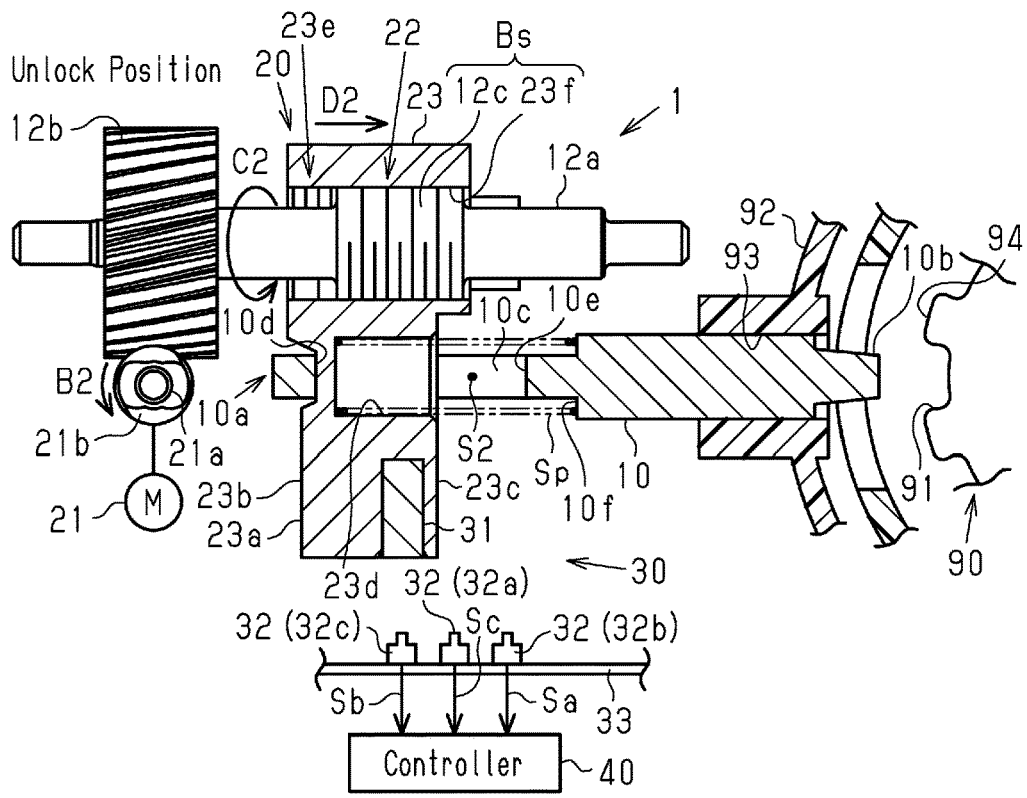
FIG. 1B is a schematic diagram of the steering lock device when the locking member is in an unlock position.
Figure 3A:
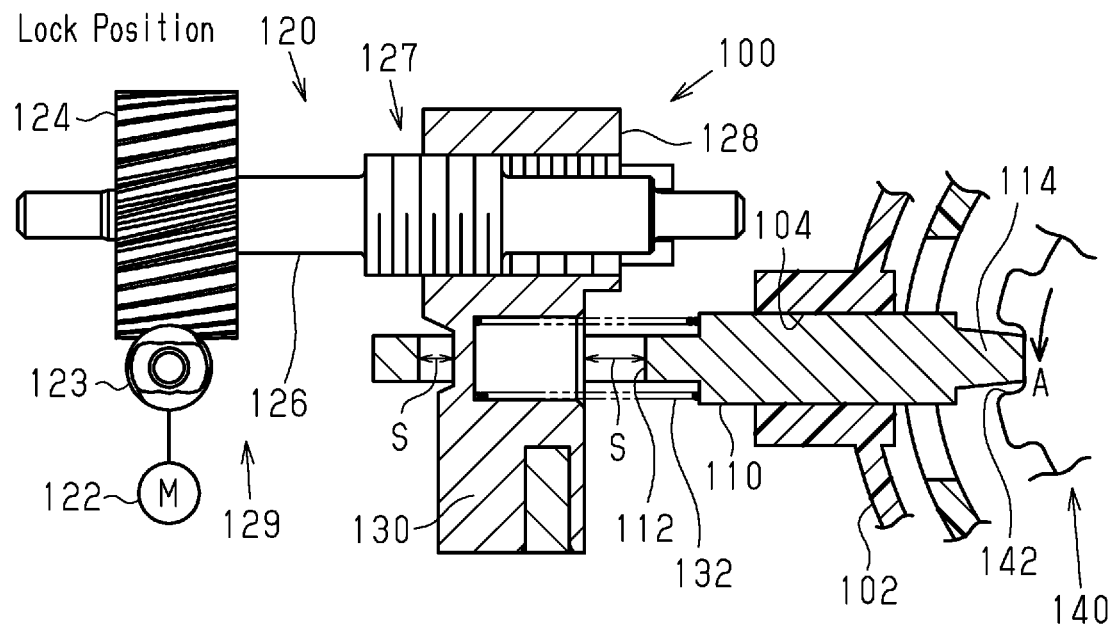
FIG. 3A is a schematic diagram of a steering lock device of related art when a locking member is in a lock position.
Figure 3B:
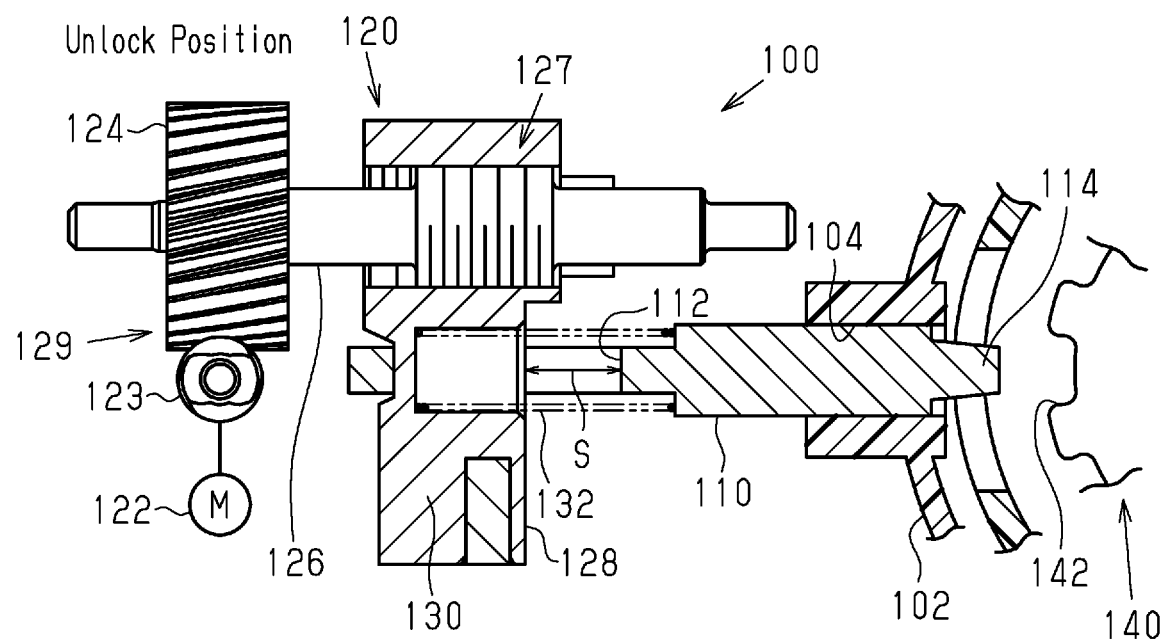
FIG. 3B is a schematic diagram of the steering lock device of related art when the locking member is in an unlock position.

As illustrated in FIG. 1B, the lock stopper 23 is moved relative to the locking member 10 in the unlock direction and comes into contact with the first inner surface 10d of the locking member 10. After the lock stopper 23 contacts the first inner surface 10d, the lock stopper 23 is moved integrally with the locking member 10 in the unlock direction. This separates the distal portion 10b of the locking member 10 from the recess 91 of the steering shaft 90 and unlocks the steering shaft 90. In the present description, a state in which the lock stopper 23 is moved relative to the locking member 10 by the drive force transmitted by the transmission mechanism 22 will be referred to as the relative movement state. Further, a state in which the lock stopper 23 is moved together with the locking member 10 by the drive force will be referred to as the integral movement state. In the present example, when the locking member 10 is moved from the lock position to the unlock position, the lock stopper 23 is in the relative movement state until contacting the first inner surface 10d. After contacting the first inner surface 10d, the lock stopper 23 is in the integral movement state.

Movement from Unlock Position to Lock Position

As illustrated in FIG. 1B, when the rotation shaft 21a of the motor 21 is rotated in the other direction (direction B2 indicated by arrow in FIG. 1B), the rotation shaft 12a is rotated in the other direction (direction C2 indicated by arrow in FIG. 1B) and the lock stopper 23 is moved in a lock direction (direction D2 indicated by arrow in FIG. 1B), that is, toward the steering shaft 90. In this case, the lock stopper 23 is moved relative to the locking member 10 thereby increasing the first gap S1.

Referring to FIG. 1A, when the lock stopper 23 is moved in the lock direction, the coil spring Sp located between the lock stopper 23 and the locking member 10 is compressed between an end surface of the receptacle 23d and the step 10f of the locking member 10. Compression of the coil spring Sp increases the elastic force of the coil spring Sp (biasing force applied to locking member 10). When the elastic force of the coil spring Sp reaches a value that moves the locking member 10 in the lock direction, the lock stopper 23 is moved integrally with the locking member 10 in the lock direction. This engages the distal portion 10b of the locking member 10 with the recess 91 of the steering shaft 90 and locks the steering shaft 90. In the present example, when the locking member 10 is moved from the unlock position to the lock position, the lock stopper 23 is in the relative movement state and accumulates elastic force, which moves the locking member 10 in the lock direction, in the coil spring Sp. After the elastic force is accumulated in the coil spring Sp, the lock stopper 23 enters the integral movement state.

When the locking member 10 is moved toward the lock position, the distal portion 10b of the locking member 10 may oppose a projection 94 that is arranged adjacent to the recess 91 of the steering shaft 90. In such a case, if the locking member 10 is moved in the lock direction, the locking member 10 will be in a semi-engaged state in which the distal portion 10b of the locking member 10 contacts the projection 94. In this case, if the steering wheel is operated and the steering shaft 90 is rotated by a predetermined amount, the biasing force of the coil spring Sp will force the distal portion 10b of the locking member 10 into engagement with the recess 91 when reaching a location opposing the recess 91. This dissolves the semi-engaged state.

The determination of the position of the locking member 10 and the lock stopper 23 will now be described.

As described above, the locking member 10 is moved from the lock position to the unlock position or from the unlock position to the lock position based on the movement of the lock stopper 23 that transmits the drive force of the motor 21 to the locking member 10. A condition for starting movement of the locking member 10 (lock stopper 23) from the lock position to the unlock position may be, for example, the pressing of an engine switch located near the driver seat while the brake pedal is being depressed in a state in which smart verification is accomplished. A condition for starting movement of the locking member 10 (lock stopper 23) from the unlock position to the lock position may be, for example, the pressing of the engine switch located near the driver seat to stop the engine.

When the locking member 10 (lock stopper 23) is moved from the lock position to the unlock position, the controller 40 determines the positions of the locking member 10 and the lock stopper 23 based on the output values Sa and Sb of the second and third detectors 32b and 32c.

In the present example, when the output value Sa of the second detector 32b is a low level signal and the output value Sb of the third detector 32c is a high level signal, the controller 40 determines that the locking member 10 (lock stopper 23) is in the lock position.

When the output value Sb of the third detector 32c is shifted from a high level signal to a low level signal and the output value Sa of the second detector 32b is a low level signal, the controller 40 determines that the locking member 10 (lock stopper 23) is located at an intermediate position between the lock position and the unlock position.

When the output value Sa of the second detector 32b is shifted from a low level signal to a high level signal and the output value Sb of the third detector 32c is a low level signal, the controller 40 determines that the locking member 10 (lock stopper 23) is in the unlock position.

The failure determination of the electric steering lock device 1 will now be described.

The controller 40 stores a threshold value Vs used for the failure determination. In the present example, the threshold value Vs is set to "0".

When the locking member 10 (lock stopper 23) starts moving from the lock position to the unlock position or from the unlock position to the lock position, the controller 40 obtains the output value Sc of the first detector 32a and temporarily stores the output value Sc as an output value Vth1. For example, when the motor 21 (drive unit 20) is activated, the controller 40 obtains the output value Sc of the first detector 32a and stores the output value Sc as the output value Vth1. Further, after obtaining the output value Vth1, the controller 40 obtains and stores the output value Sc of the first detector 32a as an output value Vth2 for a period until the motor 21 (drive unit 20) is stopped.

The controller 40 is configured to calculate a differential value ΔVa of the output values Vth1 and Vth2. The differential value ΔVa is an absolute value. For example, the controller 40 calculates the differential value ΔVa in predetermined cycles. In other words, the controller 40 is configured to monitor the output value Vth2 in the predetermined cycles. When the differential value ΔVa is greater than the threshold value Vs, the controller 40 determines that the electric steering lock device 1 does not have a failure. When the differential value ΔVa is equal to the threshold value Vs, the controller 40 determines that the electric steering lock device 1 has a failure. The output value Vth1 is an example of a first output value, and the output value Vth2 is an example of a second output value. The differential value ΔVa is an example of a change in the output value Sc.

The logic for performing the failure determination of the electric steering lock device 1 by comparing the differential value ΔVa and the threshold value Vs will now be described.

For example, when the locking member 10 is in the lock position (FIG. 1A), a driver may rotate the steering wheel thereby rotating the steering shaft 90 (for example, in direction A indicted by arrow in FIG. 1A). In such a case, the distal portion 10b of the locking member 10 is pressed against the recess 91 of the steering shaft 90. This generates friction between the distal portion 10b and the recess 91. In such a situation, it may be difficult to remove the locking member 10 from the recess 91. This will hinder movement of the locking member 10 from the lock position to the unlock position.

Further, for example, when the locking member 10 is in the unlock position (FIG. 1B), external force may temporarily tilt the locking member 10. This generates friction between the locking member 10 and wall surface of the hole 93 in the housing 92. In such a situation, it may be difficult to move the locking member 10 from the unlock position to the lock position.

Further, for example, when the motor 21 fails, the lock stopper 23 and the locking member 10 cannot be moved from the lock position or the unlock position.

In this manner, a failure of the electric steering lock device 1 may occur at various parts of the drive force transmission system including the drive unit 20 and the locking member 10. However, as described above, the typical technique cannot easily distinguish a failure of the locking member 10 from a failure of the drive unit 20 such as the motor 21.

The difference between a case where the locking member 10 cannot be moved due to a failure of the drive unit 20 such as the motor 21 and a case where the locking member 10 is not moved due to another reason will be described through situations (a), (b), and (c) described below.

(a) When the locking member 10 cannot be moved from the lock position to the unlock position because of friction between the distal portion 10b of the locking member 10 and the recess 91 of the steering shaft 90, the lock stopper 23 will still be movable for a distance corresponding to the first gap S1 between the lock stopper 23 and the first inner surface 10d of the locking member 10. When the lock stopper 23 comes into contact with the first inner surface 10d, the lock stopper 23 stops. When the lock stopper 23 stops, the output value Sc of the first detector 32a stops varying. The controller 40 calculates the differential value ΔVa of the output value Vth2 and the output value Vth1 in the predetermined cycles until the output value Sc stops varying. In situation (a), the output value Vth1 is the output value Sc when the locking member 10 is in the lock position.

(b) When the locking member 10 cannot be moved from the unlock position to the lock position because of friction between the locking member 10 and the wall surface of the hole 93 in the housing 92, the lock stopper 23 may be moved at maximum for a distance corresponding to the second gap S2 between the lock stopper 23 and the second inner surface 10e of the locking member 10. In this case, when the lock stopper 23 cannot be further moved in the lock direction by the elastic force of the coil spring Sp, the lock stopper 23 stops. When the lock stopper 23 stops, the output value Sc of the first detector 32a stops varying. The controller 40 calculates the differential value ΔVa of the output value Vth2 and the output value Vth1 in the predetermined cycles until the output value Sc stops varying. In situation (b), the output value Vth1 is the output value Sc when the locking member 10 is in the unlock position.

In the present embodiment, when the locking member 10 cannot be moved from the unlock position, the distance the lock stopper 23 can be moved from the unlock position toward the lock position is equal to the distance the lock stopper 23 is moved until coming into contact with the first inner surface 10d in situation (a).

(c) For example, when the motor 21 has a failure, the motor 21 does not produce drive force and the lock stopper 23 is not moved. Accordingly, the locking member 10 cannot be moved from the lock position to the unlock position or from the unlock position to the lock position. When the lock stopper 23 remains in place, the output value Sc of the first detector 32a does not change. The controller 40 calculates the differential value ΔVa of the output value Vth2 and the output value Vth1. Since the output value Sc does not change, the differential value ΔVa is "0".

Taking into consideration the above situations (a), (b), and (c), the movement distance of the lock stopper 23 may be checked to determine the part of the drive force transmission system in the electric steering lock device 1 that has a failure. For example, the controller 40 determines whether the lock stopper 23 is moving to determine failure of the motor 21 of the transmission mechanism 22.

When the differential value ΔVa is greater than "0", the lock stopper 23 is moving. Further, when the differential value ΔVa is equal to "0", the lock stopper 23 is not moving.

In the present example, the threshold value Vs is set to "0" to determine whether the lock stopper 23 is moving. Thus, when the differential value ΔVa is greater than the threshold value Vs, the drive unit 20 (lock stopper 23) is moving from the lock position to the unlock position or from the unlock position to the lock position. In this case, the controller 40 determines that the electric steering lock device 1 does not have failure. Further, when the differential value ΔVa is equal to the threshold value Vs, the drive unit 20 (lock stopper 23) is not moving from the lock position to the unlock position or from the unlock position to the lock position. In this case, the controller 40 determines that the motor 21 (transmission mechanism 22) has a failure.

The effects and advantages of the present embodiment will now be described.

(1) The controller 40 performs the failure determination based on changes in the output value of the detection unit 32 caused by movement of the lock stopper 23. In the present example, the output value Sc of the first detector 32a reflects the movement state of the lock stopper 23. Thus, the controller 40 can determine the part of the drive force transmission system that has a failure based on the output value of the detection unit 32, which indicates the movement state of the lock stopper 23.

(2) The controller 40 performs the failure determination based on the output value Vth1, which is obtained when the drive unit 20 is starts operating, and the output value Vth2, which is obtained while the drive unit 20 is operating. This configuration improves the accuracy for determining the part of the drive force transmission system in the electric steering lock device 1 where a failure has occurred.

(3) When the threshold value Vs is set to "0" and the differential value ΔVa is equal to the threshold value Vs ("0"), the controller 40 determines that the transmission mechanism 22 (for example, motor 21) of the drive unit 20 has a failure.

It should be apparent to those skilled in the art that the foregoing embodiments may be implemented in many other specific forms without departing from the scope of this disclosure. Particularly, it should be understood that the foregoing embodiments may be implemented in the following forms.

The above embodiment and the following modifications can be combined as long as the combined modifications remain technically consistent with each other.

In the above embodiment, when the lock stopper 23 cannot be moved because of a failure of the motor 21, the controller 40 determines that the transmission mechanism 22 of the drive unit 20 has a failure. However, movement of the lock stopper 23 may be hindered because of reasons other than failure of the motor 21.

For example, external force may temporarily tilt the rotation shaft 12a and adversely affect the operation of the ball threaded mechanism Bs. In such a case, the rotation force of the rotation shaft 12a may not be properly converted by the ball threaded mechanism Bs into linear forward and backward movement of the lock stopper 23. This hinders movement of the lock stopper 23. In this case, the differential value ΔVa of the output values Vth1 and Vth2 is also equal to the threshold value Vs. Thus, the controller 40 determines that the transmission mechanism 22 of the drive unit 20 (in this case, ball threaded mechanism Bs) has a failure.

The threshold value Vs, for example, may be set to a value greater than "0". A failure of the motor 21 is not limited to a cracked magnet or the like that decreases the drive force of the motor 21. For example, breakage of part of a motor coil of the motor 21 may decrease the drive force of the motor 21. In this case, the drive force of the motor 21 may slightly move the lock stopper 23. Thus, the threshold value Vs may be set based on experiments that measure the movement distance of the lock stopper 23 in the first gap S1 and the second gap S2 resulting from a failure of the motor 21.

Further, the threshold value Vs may be set to a value greater than "0" taking into consideration, as described in the above modified example, a case where the rotation shaft 12a is tilted thereby adversely affecting the operation of the ball threaded mechanism Bs. Depending on the tilt of the rotation shaft 12a, the ball threaded mechanism Bs may linearly move the lock stopper 23 forward and backward over a slight distance. In this case, the threshold value Vs may also be set based on experiments that measure the movement distance of the lock stopper 23 in the first gap S1 and the second gap S2 resulting from tilt of the rotation shaft 12a.

In this manner, the threshold value Vs may be set to a differential value between the output value Sc (Vth1), which is obtained when the motor 21 starts to operate, and the output value Sc (Vth2), which is obtained when the lock stopper 23 is moved over a predetermined distance in the first gap S1 and the second gap S2. The predetermined distance is the distance the lock stopper 23 can be moved without coming into contact with the first inner surface 10d of the locking member 10 or the distance the lock stopper 23 can be moved without the coil spring Sp applying elastic force that moves the locking member 10 in the lock direction.

In the above embodiment, for example, when a predetermined period elapses after the output value Vth1 is obtained, the controller 40 may obtain the output value Sc of the first detector 32a as the output value Vth2. The predetermined period may be the period from when the output value Vth1 is obtained until when the lock stopper 23 is moved in the integral movement state. The predetermined period may be set in advance through experiments to move the locking member 10 of the electric steering lock device 1 to the lock position and the unlock position.

In the present modified example, the threshold value Vs is set to the differential value ΔVa between the output value Sc (Vth2), which is obtained when the lock stopper 23 is shifted from the relative movement state to the integral movement state, and the output value Vth1. In this case, when the differential value ΔVa of the output value Sc (Vth2), which is obtained after the predetermined period from when the output value Vth1 is obtained, and the output value Vth1 is equal to "0" during operation, the controller 40 determines that the transmission mechanism 22 (for example, motor 21) has a failure. Further, when the differential value ΔVa is less than the threshold value Vs, the lock stopper 23 is in the relative movement state. Thus, the controller 40 determines that an abnormality has occurred in the transmission mechanism 22. The configuration of such the modified example improves the accuracy for estimating part of the drive force transmission system in the electric steering lock device 1 that has a failure.

In the above embodiment, the controller 40 uses the detection unit 32 of which the output value Sc varies in accordance with the lock stopper 23 (that is, movable member) to determine the part of the drive force transmission system in the electric steering lock device 1 that has a failure. Instead, a detector of which the output value varies in accordance with the action of the transmission mechanism 22 may be used. For example, a rotation angle sensor of which the output value varies in accordance with the rotation of the rotation shaft 12a (gear 12b) of the ball threaded mechanism Bs or the rotation of the rotation shaft 21a of the motor 21 may be used. For example, the rotation angle sensor is configured to detect rotation speed of the rotation shaft 21a of the motor 21. In this case, the controller 40 obtains an output value of the rotation angle sensor as a first rotation speed when the motor 21 starts to operate. Further, after obtaining the first rotation speed, the controller 40 obtains the output value of the rotation angle sensor as a second rotation speed until the motor 21 stops operating. Then, the controller 40 may perform the failure determination based on the first and second rotation speeds. The rotation angle sensor may be configured to detect the rotation speed of the rotation shaft 12a.

In the above embodiment, the coil spring Sp may be omitted. In this case, during the lock operation, the lock stopper 23 of the drive unit 20 is in the relative movement state until the lock stopper 23 contacts the second inner surface 10e of the locking member 10, that is, until the second gap S2 is closed. After contacting the second inner surface 10e, the lock stopper 23 is in the integral movement state and moves the locking member 10 to the lock position.

In the above embodiment, the movement distance of the lock stopper 23 when the locking member 10 is not moved from the unlock position because of the friction between the locking member 10 and the hole 93 of the housing 92 may be changed. In this case, within a movement range of the lock stopper 23 until contacting the second inner surface 10e, a location where the lock stopper 23 stops may be adjusted, for example, in accordance with the elastic force of the coil spring Sp.

In the above embodiment, the first detector 32a does not have to be a magnetic sensor, and for example, may be an optical sensor or the like. If an optical sensor is used, the magnet 31 is omitted, and, for example, a combination of a light emission element and a light receiving element may be used.

In the above embodiment, the first detector 32a has a parabolic output waveform including a peak value Vk at a peak of change in the output. Instead, the first detector 32a may have a parabolic output waveform of which the peak of change in the output is a minimum value.

In the above embodiment, the position determination of the locking member 10 and the lock stopper 23 may be performed taking into consideration changes in the output value Sc of the first detector 32a. In this case, for example, the output value Sc of the first detector 32a is compared to a predetermined threshold value and then the position determination of the locking member 10 and the lock stopper 23 is performed taking into consideration the comparison result.

In the above embodiment, the failure determination of the electric steering lock device 1 is performed based on the output values Vth1 and Vth2 of the first detector 32a. However, multiple digital detectors of which the outputs are digital values may be used instead of the first detector 32a. In this case, the number of the detectors may be adjusted so that at least one of the detectors is shifted from a high level signal to a low level signal when the lock stopper 23 is moved in the first gap S1 and the second gap S2. With this configuration, when any of the multiple detectors are not shifted from a high level signal to a low level signal (that is, lock stopper 23 has not been moved), the controller 40 may determine that the transmission mechanism 22 of the drive unit 20 (for example, motor 21) has a failure. Further, at least one of the detectors is shifted from a high level signal to a low level signal (that is, lock stopper 23 has been moved), the controller 40 may determine that the transmission mechanism 22 of the drive unit 20 does not have failure.

Further, when the digital detectors are used instead of the first detector 32a, a threshold value may be set to the number of the detectors that are shifted from a high level signal to a low level signal. For example, when the threshold value is set to "1", if only one of the detectors is shifted from a high level signal to a low level signal, the controller 40 may determine that the electric steering lock device 1 has a failure. Further, if two or more detectors are shifted from a high level signal to a low level signal, the controller 40 may determine that the electric steering lock device 1 does not have a failure. With this configuration, the controller 40 can also detect a failure of the motor 21, with which the motor 21 has a broken part in the motor coil that decreases the drive force of the motor 21 and moves the lock stopper 23 slightly. The number of the detectors that are shifted from a high level signal to a low level signal may be changed in accordance with the movement distance of the lock stopper 23. In the present modified example, a high level signal is an example of the first output value, and a low level signal is an example of the second output value.

The lock device is not limited to the electric steering lock device 1. The configuration of the lock device described in the above embodiment and modified examples may be applied to any lock device that locks and unlocks a locking subject. For example, a locking subject may be a lid of an oil filler cap or an electric power filler cap on a vehicle. That is, the lock device may be a lid lock device.

In the above embodiment, the driving source is not limited to the motor 21, and may be a solenoid or the like. The present modified example is not limited to the electric steering lock device 1 and may be applied to any lock device.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A lock device, comprising:
   a locking member configured to be moved between a lock position at which the locking member locks a locking subject and an unlock position at which the locking member unlocks the locking subject;
   a drive unit including:
      a movable member configured to be moved by a drive force, and
      a transmission mechanism configured to transmit the drive force to the movable member and move the movable member, wherein
      the movable member is configured to be moved in a movement state that is shifted between a relative movement state in which the movable member is moved relative to the locking member and an integral movement state in which the movable member is moved together with the locking member to move the locking member toward the lock position or the unlock position;
   a detector of which an output value varies in accordance with movement of the movable member or the transmission mechanism; and
   a controller that performs a failure determination based on a change in the output value,
   wherein the controller is configured to
      control driving of the drive unit,
      obtain the output value of the detector as a first output value when the drive unit starts operating,
      obtain the output value of the detector as a second output value during a period from when the first output value is obtained to before the drive unit stops operating, and
      perform the failure determination by determining whether a differential value of the first output value and the second output value changes.

2. The lock device according to claim 1, wherein the controller is further configured to perform the failure determination based on whether the differential value of the first output value and the second output value indicating the change in the output value exceeds a threshold value.

3. The lock device according to claim 2, wherein the controller sets the threshold value to zero.

4. The lock device according to claim 1, wherein the detector is an analog sensor that is arranged at an intermediate position between the lock position and the unlock position.

5. The lock device according to claim 1, wherein the lock device is a steering lock device.

6. A lock device, comprising:
   a locking member configured to be moved between a lock position at which the locking member locks a locking subject and an unlock position at which the locking member unlocks the locking subject;
   a drive unit including:
      a movable member configured to be moved by a drive force, and
      a transmission mechanism configured to transmit the drive force to the movable member and move the movable member, wherein
      the movable member is configured to be moved in a movement state that is shifted between a relative movement state in which the movable member is moved relative to the locking member and an integral movement state in which the movable member is moved together with the locking member to move the locking member toward the lock position or the unlock position;
   a detector of which an output value varies in accordance with movement of the movable member or the transmission mechanism; and
   a controller that performs a failure determination based on a change in the output value,
   wherein the controller is configured to
      control driving of the drive unit,
      obtain the output value of the detector as a first output value when the drive unit starts operating,
      obtain the output value of the detector as a second output value during a period from when the first output value is obtained to before the drive unit stops operating, and
      perform the failure determination based on whether a differential value of the first output value and the second output value indicating the change in the output value exceeds a threshold value.

7. The lock device according to claim 6, wherein the controller sets the threshold value to zero.

8. The lock device according to claim 6, wherein the detector is an analog sensor that is arranged at an intermediate position between the lock position and the unlock position.

9. The lock device according to claim 6, wherein the lock device is a steering lock device.

* * * * *